United States Patent
Lee et al.

(10) Patent No.: US 11,140,325 B2
(45) Date of Patent: Oct. 5, 2021

(54) METHOD AND ELECTRONIC DEVICE FOR CONTROLLING PLURALITY OF CAMERAS

(71) Applicant: Samsung Electronics Co., Ltd., Suwon-si (KR)

(72) Inventors: Jonghyub Lee, Suwon-si (KR); Haesun Lee, Suwon-si (KR); Sugon Baek, Yongin-si (KR); Jongkeun Shin, Yongin-si (KR); Jonghun Won, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/468,463

(22) PCT Filed: Nov. 28, 2017

(86) PCT No.: PCT/KR2017/013704
§ 371 (c)(1),
(2) Date: Jun. 11, 2019

(87) PCT Pub. No.: WO2018/139752
PCT Pub. Date: Aug. 2, 2018

(65) Prior Publication Data
US 2020/0077031 A1 Mar. 5, 2020

(30) Foreign Application Priority Data
Jan. 24, 2017 (KR) .......... 10-2017-0011029

(51) Int. Cl.
*H04N 5/232* (2006.01)
*H04N 5/235* (2006.01)
*H04N 5/247* (2006.01)

(52) U.S. Cl.
CPC ..... *H04N 5/232939* (2018.08); *H04N 5/2351* (2013.01); *H04N 5/247* (2013.01)

(58) Field of Classification Search
CPC . H04N 5/232939; H04N 5/2351; H04N 5/247
See application file for complete search history.

(56) References Cited

U.S. PATENT DOCUMENTS 10,142,551 B2 * 11/2018 Lee .................. G06K 9/3258
10,267,677 B1 * 4/2019 Sarkar ............... G01J 3/524
(Continued)

FOREIGN PATENT DOCUMENTS

CN 105812677 A * 7/2016
CN 105812677 A 7/2016
(Continued)

*Primary Examiner* — Antoinette T Spinks
(74) *Attorney, Agent, or Firm* — Jefferson IP Law, LLP

(57) ABSTRACT

Various embodiments of the present invention comprise: a first image sensor for acquiring a first image of an external object; a second image sensor for acquiring a second image of the external object; and a processor, wherein the processor is set so as to: acquire, through the first image sensor, the first image by using a first setting related to an exposure for the external object; acquire, through the second image sensor, the second image by using a second setting related to the exposure, during the operation of acquiring the first image; select one corresponding setting from among the first setting and the second setting on the basis of at least the first image or the second image; and acquire, through the first image sensor or the second image sensor, a third image of the external object on the basis of at least the one corresponding setting, thereby enabling an entry time of a dual camera mounted on a rear surface of an electronic device to be reduced. Other various embodiments are possible in addition to the embodiments disclosed in the present invention.

8 Claims, 10 Drawing Sheets

(56) References Cited

U.S. PATENT DOCUMENTS

| | | |
|---|---|---|
| 2008/0024614 A1 | 1/2008 | Li et al. |
| 2014/0132735 A1 | 5/2014 | Lee et al. |
| 2015/0085077 A1* | 3/2015 | Kim .................... H04N 5/2353 348/46 |
| 2020/0077031 A1* | 3/2020 | Lee ........................ H04M 1/02 |

FOREIGN PATENT DOCUMENTS

| | | | |
|---|---|---|---|
| JP | 2006-081083 A | | 3/2006 |
| JP | 2009-147977 A | | 7/2009 |
| JP | 2009147977 A | * | 7/2009 |
| KR | 10-2010-0109269 A | | 10/2010 |
| KR | 10-2014-0062801 A | | 5/2014 |

\* cited by examiner

METHOD AND ELECTRONIC DEVICE FOR CONTROLLING PLURALITY OF CAMERAS

TECHNICAL FIELD

Various embodiments of the disclosure relate to a method and an electronic device for controlling a plurality of cameras (e.g., dual cameras) provided on one side of the electronic device.

BACKGROUND ART

As the technology for electronic devices evolves, cameras with various capabilities are being installed in portable electronic devices.

A portable electronic device may have, for example, a high-pixel camera on the front side and a low-pixel camera on the rear side.

The portable electronic device may select the front camera or the rear camera independently to photograph a front target object or a rear target object.

DISCLOSURE OF INVENTION

Technical Problem

To enter an appropriate illuminance (brightness) level in various illuminance environments (e.g., high-illuminance to low-illuminance), the front and rear cameras mounted in a portable electronic device perform a series of illuminance prediction operations.

The range of illumination control of the image sensor built in the camera of a portable electronic device is limited. When one camera is mounted on the rear of the portable electronic device, it may take a long time to predict the illuminance, and hence a large number of frames are required.

When one camera is mounted on the rear of the portable electronic device, as many frames are required until the illumination prediction is completed through the output of the image sensor after the initial exposure setting of the rear camera, the entry time of the rear camera may become longer.

For example, while the rear camera of the portable electronic device performs illuminance prediction for the external environment, the output of the image sensor may be not shown as a preview on the display. As the image sensor output starts to be previewed from the time when the illumination prediction is completed, the entry time of the rear camera may become longer.

Various embodiments of the disclosure are to provide a method for controlling dual cameras and an electronic device supporting the method wherein a dual camera module including a first camera and a second camera is mounted on one side of the electronic device, illuminance prediction is performed using the first image sensor and the second image sensor of the first camera and the second camera, and the exposure of the dual camera module is set based on the predicted illuminance.

Solution to Problem

According to an embodiment of the disclosure, there is provided an electronic device. The electronic device may include: a first image sensor to obtain a first image of an external object; a second image sensor to obtain a second image of the external object; and a processor, wherein the processor may be configured to: obtain the first image through the first image sensor based on a first setting associated with exposure to the external object; obtain the second image through the second image sensor based on a second setting associated with the exposure while obtaining the first image; select a corresponding one of the first setting and the second setting based at least on the first image or the second image; and obtain a third image of the external object through the first image sensor or the second image sensor based at least on the corresponding setting.

According to an embodiment of the disclosure, there is provided a method for controlling dual cameras. The method may include: controlling, by a processor, a first image sensor to obtain a first image based on a first setting associated with exposure to an external object; controlling, by the processor, a second image sensor to obtain a second image based on a second setting associated with the exposure while obtaining the first image; selecting, by the processor, a corresponding one of the first setting and the second setting based at least on the first image or the second image; and controlling, by the processor, the first image sensor or the second image sensor to obtain a third image of the external object based at least on the corresponding setting.

According to an embodiment of the disclosure, there is provided a method for controlling dual cameras. The method may include: turning on, a processor, the dual cameras; controlling, by the processor, a first image sensor and a second image sensor to operate; measuring, by the processor, the illuminance of the surrounding environment and determining whether the measured illuminance is above a preset threshold; predicting, by the processor, the illuminance using the first image sensor if the measured illuminance is above the preset threshold; predicting, by the processor, the illuminance using the second image sensor if the measured illuminance is below the preset threshold; and completing, by the processor, the illuminance prediction using at least one of the first image sensor or the second image sensor.

Advantageous Effects of Invention

According to various embodiments of the disclosure, the output of the first image sensor and the second image sensor of the dual camera module mounted on one side of the electronic device is used to perform illumination prediction while reducing the number of illumination prediction frames, and the exposure of the dual camera module is set based on the predicted illuminance. Hence, the entry time of the dual cameras can be shortened.

MODE FOR THE INVENTION

Figure 1:
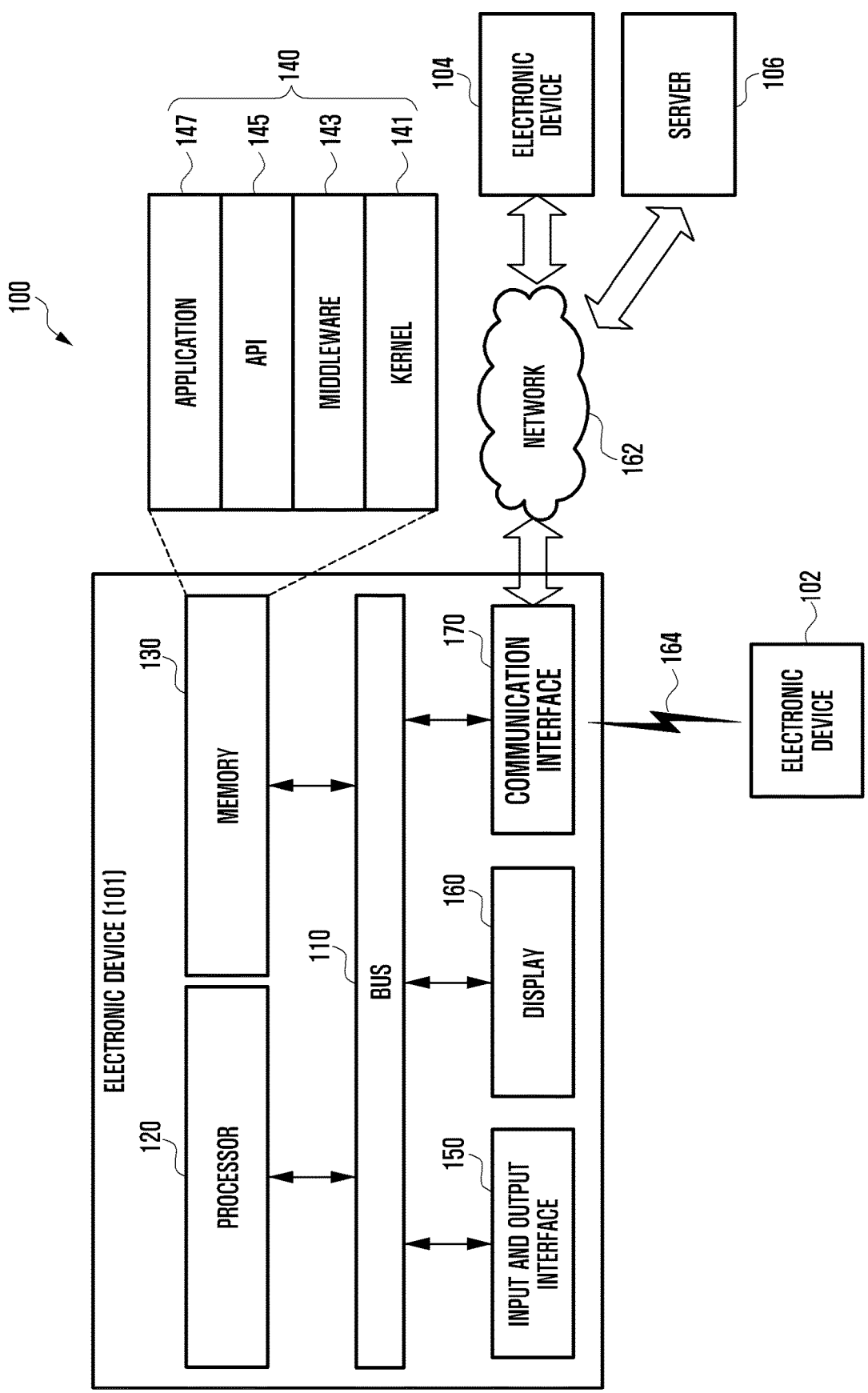
FIG. 1 illustrates a network environment including electronic devices according to various embodiments of the disclosure.

Hereinafter, the present disclosure will be described with reference to the accompanying drawings. Various embodiments of the present disclosure are not limited to a specific implementation form and it should be understood that the present disclosure includes all changes and/or equivalents and substitutes included in the spirit and scope of various embodiments of the present disclosure.

In connection with descriptions of the drawings, similar components are designated by the same reference numeral.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B. The terms such as "first" and "second" as used herein may modify various elements regardless of an order and/or importance of the corresponding elements, and do not limit the corresponding elements. These terms may be used for the purpose of distinguishing one element from another element. It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Electronic devices according to embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMOs)), fabric or clothing integral wearable devices (e.g., electronic clothes), body-mounted wearable devices (e.g., skin pads or tattoos), or implantable wearable devices (e.g., implantable circuits). The electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like). The electronic devices may be further included in furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

The term "user" as used herein may refer to a person who uses an electronic device or may refer to a device (e.g., an artificial intelligence electronic device) which uses an electronic device.

FIG. 1 illustrates a network environment including an electronic device according to an embodiment of the present disclosure.

Referring to FIG. 1, the electronic device 101 or server 106 can be connected via a network 162 or wireless communication 164 each other.

Referring to FIG. 1, a network environment 100 includes an electronic device 101 having a bus 110, a processor 120, a memory 130, an input/output interface 150, a display 160, and a communication interface 170. At least one of the above described components may be omitted from the electronic device 101 or another component may be further included in the electronic device 101. The bus 110 may be a circuit connecting the above described components 120, 130, and 150-170 and transmitting communications (e.g., control messages and/or data) between the above described components. The processor 120 may include one or more of a CPU, an AP, and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands related to at least one of other components of the electronic device 101. The memory 130 is capable of storing software and/or a program module 140. For example, the program module 140 may include a kernel 141, middleware 143, an application programming interface (API) 145, application programs (or applications) 147, etc. The kernel 141, the middleware 143 or at least part of the API 145 may be referred to as an operating system (OS). The kernel 141 is capable of controlling or managing system resources (e.g., the bus 110, the processor 120, the memory 130, etc.) used to execute operations or functions of other programs (e.g., the middleware 143, the API 145, and the application programs 147). The kernel 141 provides an interface capable of allowing the middleware 143, the API 145, and the application programs 147 to access and control/manage the individual components of the electronic device 101.

The middleware 143 may be an interface between the API 145 or the application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, the processor 120, the memory 130, etc.) to at least one of the application programs 147. For example, the middleware 143 processes one or more task requests according to a priority assigned to at least one application program, thereby performing scheduling or load balancing for the task requests.

The API 145 may be an interface that is configured to allow the application programs 147 to control functions provided by the kernel 141 or the middleware 143. The API 145 may include at least one interface or function (e.g., instructions) for file control, window control, image process, text control, or the like. The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED (OLED) display, micro-electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen or a user's body. The communication interface 170 is capable of establishing communication between the electronic device 101 and an external device For example, the communication interface 170 is capable of communicating with an external device connected to a network 162 via wired or wireless communication.

Wireless communication may employ a cellular communication protocol such as long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM). Wireless communication may also include a short-range wireless communication link 164. The short-wireless communication link 164 may include at least one of wireless fidelity (Wi-Fi), Bluetooth (BT), near field communication (NFC), magnetic secure transmission (MST), and global navigation satellite system (GNSS). The GNSS may include at least one of GPS, global navigation satellite system (Glonass), Beidou GNSS (Beidou), Galileo, the European global satellite-based navigation system, according to GNSS using areas, bandwidths, etc. In the present disclosure, the terms "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of a telecommunications network, e.g., a computer network (e.g., local area network (LAN) or wide area network (WAN)), the Internet, and a telephone network.

A first external electronic device 102 and a second external electronic device 104 are each identical to or different from the electronic device 101. According to an embodiment, a server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from another electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
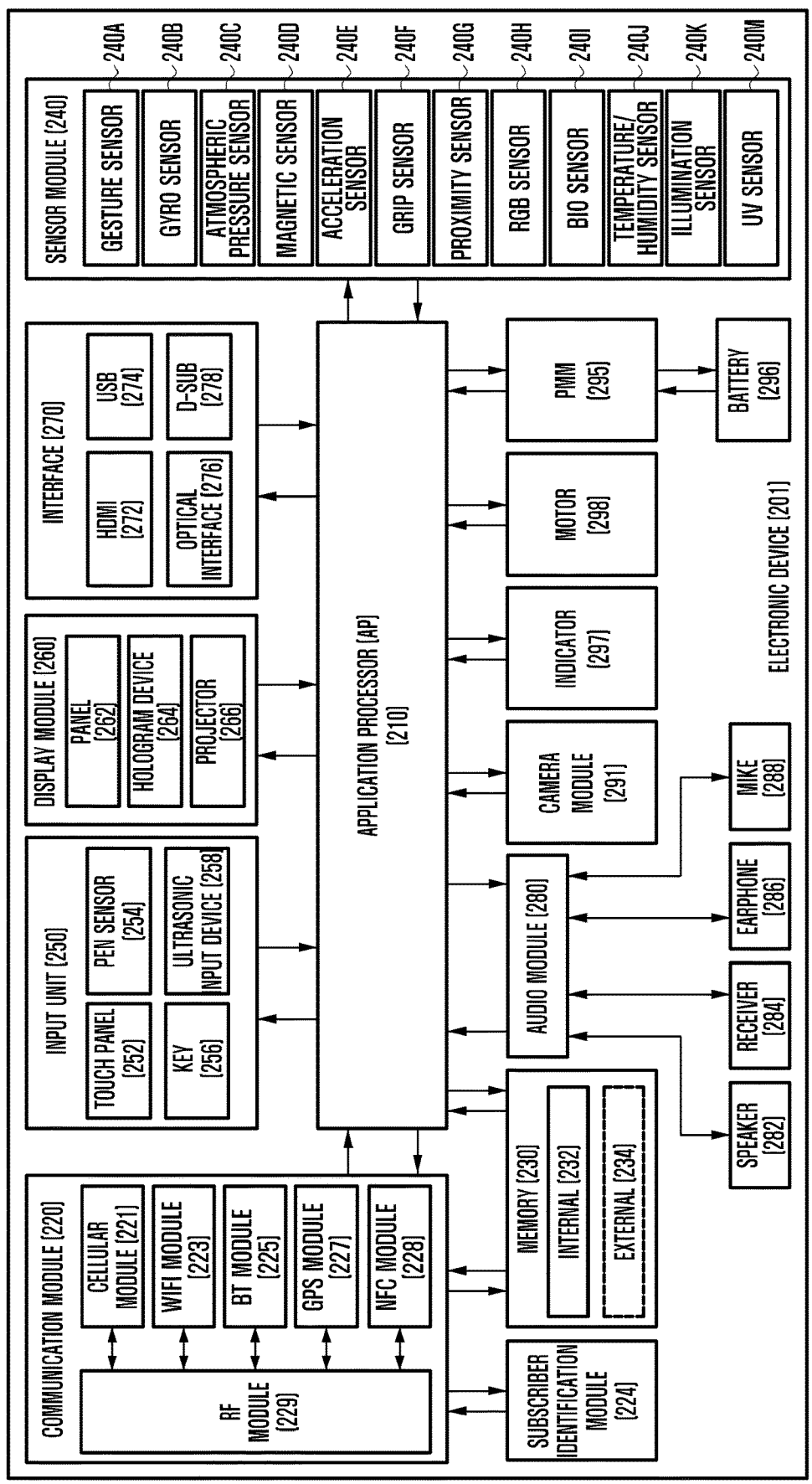
FIG. 2 is a block diagram of an electronic device according to various embodiments of the disclosure.

FIG. 2 is a block diagram showing a configuration of an electronic device according to an embodiment of the present disclosure.

Referring to FIG. 2, an electronic device 201 may include a part or all of the components in the electronic device 101 shown in FIG. 1. The electronic device 201 may include one or more processors 210 (e.g., APs), a communication module 220, a subscriber identification module (SIM) 224, a memory 230, a sensor module 240, an input device 250, a display module 260, an interface 270, an audio module 280, a camera module 291, a power management module 295, a battery 296, an indicator 297, and a motor 298.

The processor 210 is capable of driving, for example, an OS or an application program to control a plurality of hardware or software components connected to the processor 210, processing various data, and performing operations.

The processor 210 may be implemented as, for example, a system on chip (SoC). The processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication interface 170 is capable of including the cellular module 221, a Wi-Fi module 223, a BT module 225, a GNSS module 227 (e.g., a GPS module, Glonass module, Beidou module or Galileo module), an NFC module 228, and a radio frequency (RF) module 229. The cellular module 221 is capable of providing a voice call, a video call, a short message service (SMS) service, an Internet service, etc., through a communication network, for example. The cellular module 221 is capable of identifying and authenticating an electronic device 201 in a communication network by using the SIM 224. The cellular module 221 is capable of performing at least a part of the functions provided by the processor 210. The cellular module 221 may include a CP. Each of the Wi-Fi module 223, the BT module 225, the GNSS module 227, and the NFC module 228 may include a processor for processing data transmitted or received through the corresponding module. At least part of the cellular module 221, Wi-Fi module 223, BT module 225, GNSS module 227, and NFC module 228 (e.g., two or more modules) may be included in one integrated chip (IC) or one IC package. The RF module 229 is capable of transmission/reception of communication signals, e.g., RF signals. The RF module 229 is capable of including a transceiver, a power amplifier module (PAM), a frequency filter, a low noise amplifier (LNA), an antenna, etc. At least one of the cellular module 221, the Wi-Fi module 223, the BT module 225, the GNSS module 227, and the NFC module 228 is capable of transmission/reception of RF signals through a separate RF module.

The memory 230 may include a built-in memory 232 or an external memory 234. The built-in memory 232 is capable of including at least one of a volatile memory, e.g., a random access memory (RAM) dynamic RAM (DRAM), a static RAM (SRAM), a synchronous dynamic RAM (SDRAM), etc. and a non-volatile memory, e.g., a read only memory (ROM), one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc. The external memory 234 may include a flash drive, e.g., a compact flash (CF), a secure digital (SD), a micro-SD, a mini-SD, an extreme digital (xD), a multimedia card (MMC), a memory stick, etc. The external memory 234 may be connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and an ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint recognition sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 may include a touch panel 252, a (digital) pen sensor 254, a key 256, or an ultrasonic input device 258. The touch panel 252 may be implemented with at least one of a capacitive touch system, a resistive touch system, an IR touch system, and an ultrasonic touch system. The touch panel 252 may further include a control circuit, and the touch panel 252 may include a tactile layer to provide a tactile response to the user. The (digital) pen sensor 254 may be implemented with a part of the touch panel or with a separate recognition sheet. The key 256 may include a physical button, an optical key, or a keypad. The ultrasonic input device 258 is capable of detecting ultrasonic waves, created in an input tool, through a microphone 288, and identifying data corresponding to the detected ultrasonic waves.

The display module 260 may include a panel 262, a hologram unit 264, or a projector 266. The panel 262 may include the same or similar components as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. The display module 260 may further include a control circuit for controlling the panel 262, the hologram unit 264, or the projector 266. The interface 270 may include an HDMI 272, a USB 274, an optical interface 276, or a d-subminiature (D-sub) 278. The interface 270 may be included in the communication interface 170 shown in FIG. 1. Additionally or alternatively, the interface 270 may include a mobile high-definition link (MHL) interface, an SD card/MMC interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, a microphone 288, etc. The camera module 291 is a device capable of taking both still and moving images. The camera module 291 may include one or more image sensors (e.g., a front image sensor or a rear image sensor), a lens, an image signal processor (ISP), a flash (e.g., an LED or xenon lamp), etc. The power management module 295 is capable of managing power of the electronic device 201. The power management module 295 may include a power management integrated circuit (PMIC), a charger IC, or a battery gauge. The PMIC may employ wired charging and/or wireless charging methods.

Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296. The battery 296 may be implemented by, for example, a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. The electronic device 201 may also include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
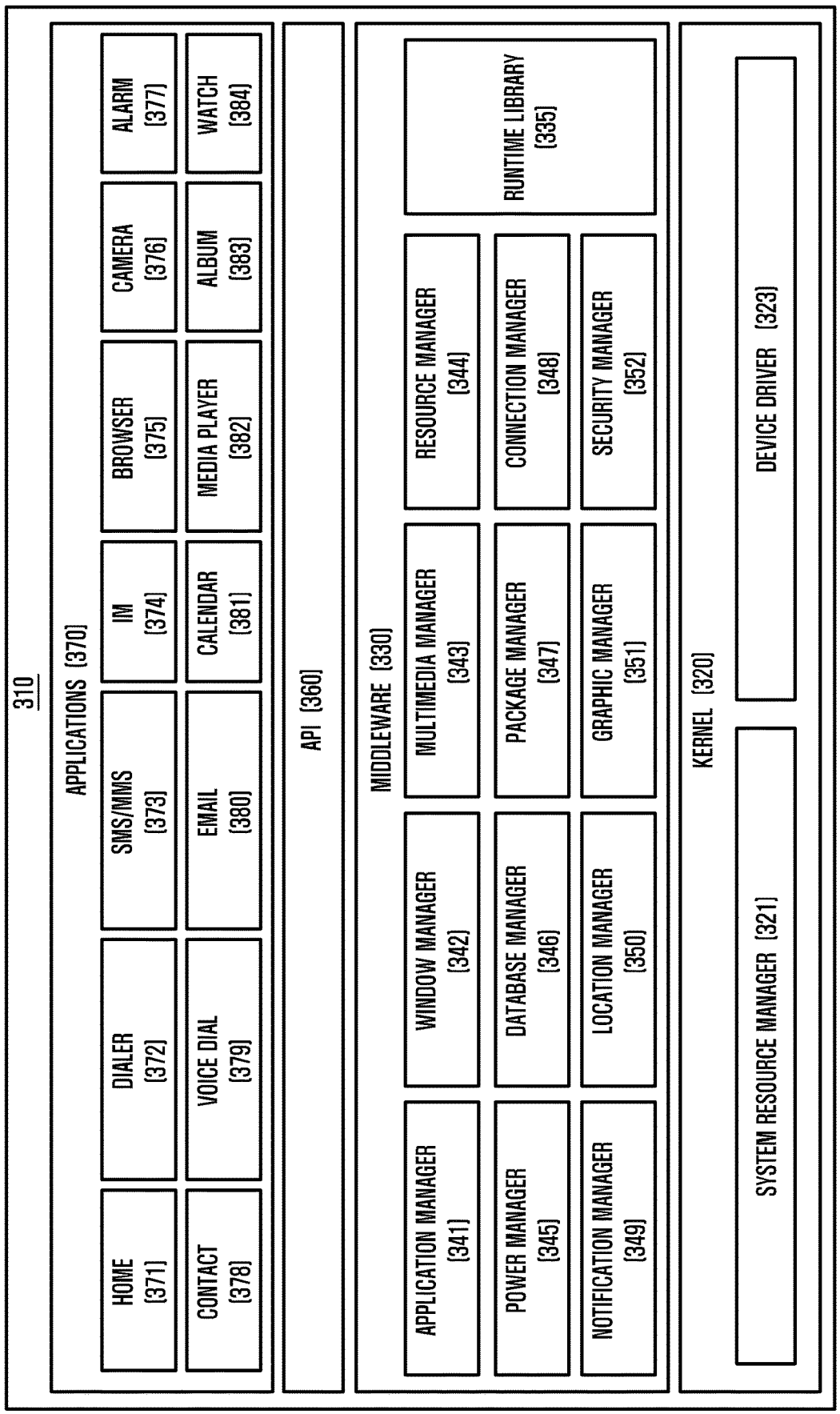
FIG. 3 is a diagram of program modules according to various embodiments of the disclosure.

FIG. 3 is a block diagram of a programming module according to an embodiment of the present disclosure.

Referring to FIG. 3, a program module 310 (e.g., the program module 140 shown in FIG. 1) is capable of including an OS for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc. The program module 310 is capable of including a kernel 320, middleware 330, an API 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a BT driver, a shared memory driver, a USB driver, a keypad driver, a Wi-Fi driver, and an audio driver. Further, according to an embodiment, the device driver 323 may include an inter-process communication (IPC) driver. The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. Furthermore, although not shown, the middleware 330 may also include a payment manager.

The runtime library 335 may include, for example, a library module used by a complier to add a new function through a programming language while the applications 370 are executed. According to an embodiment, the runtime library 335 executes input and output, management of a memory, a function associated with an arithmetic function and the like. The application manager 341 may manage, for example, a life cycle of at least one of the applications 370.

The window manager 342 may manage graphical user interface (UI) resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370. The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as Wi-Fi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a UI related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function. The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components. The API 360 (for example, API 145) may be a set of API programming functions, and may be provided with a different configuration according to an OS. For example, in Android or iOS, a single API set may be provided for each platform. In Tizen, two or more API sets may be provided.

The applications 370 (e.g., application programs 147) may include one or more applications for performing various functions, e.g., home 371, dialer 372, SMS/multi-media message service (MMS) 373, instant message (IM) 374, browser 375, camera 376, alarm 377, contact 378, voice dial 379, email 380, calendar 381, media player 382, album 383, and watch 384 (e.g., clock features). Furthermore, although not shown, the applications 370 may also include health care (e.g., an application for measuring amount of exercise, blood sugar level, etc.), and environment information (e.g., an application for providing atmospheric pressure, humidity, temperature, etc.). According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices. According to an embodiment, the applications 370 are capable of including an application (e.g., a health care application of a mobile medical device, etc.) having specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of OSs.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and Programmable-Logic Device known or to be developed for certain operations.

According to various embodiments of the present disclosure, the devices (e.g. modules or their functions) or methods may be implemented by computer program instructions stored in a computer-readable storage medium. In the case that the instructions are executed by at least one processor (e.g., the processor 120), the at least one processor may execute the functions corresponding to the instructions. The computer-readable storage medium may be the memory 130. At least a part of the programing module may be implemented (e.g. executed) by the processor 120. At least a part of the programing module may include modules, programs, routines, sets of instructions, and processes for executing the at least one function. According to various embodiments of the present disclosure, a non-transitory computer-readable recording medium having, recorded thereon, a program may include instructions of identifying contextual information associated with a fingerprint input of a fingerprint recognition sensor, determining the fingerprint recognition sensor to operate in a first sensing mode if the contextual information satisfies a first condition, determining the fingerprint recognition sensor to operate in a second sensing mode if the contextual information satisfies a second condition, and obtaining fingerprint information from the fingerprint input through the fingerprint recognition sensor. The computer-readable storage medium includes magnetic media such as a floppy disk and a magnetic tape, optical media including a compact disc (CD) ROM and a DVD ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various embodiments of the present disclosure.

Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure.

Figure 4:
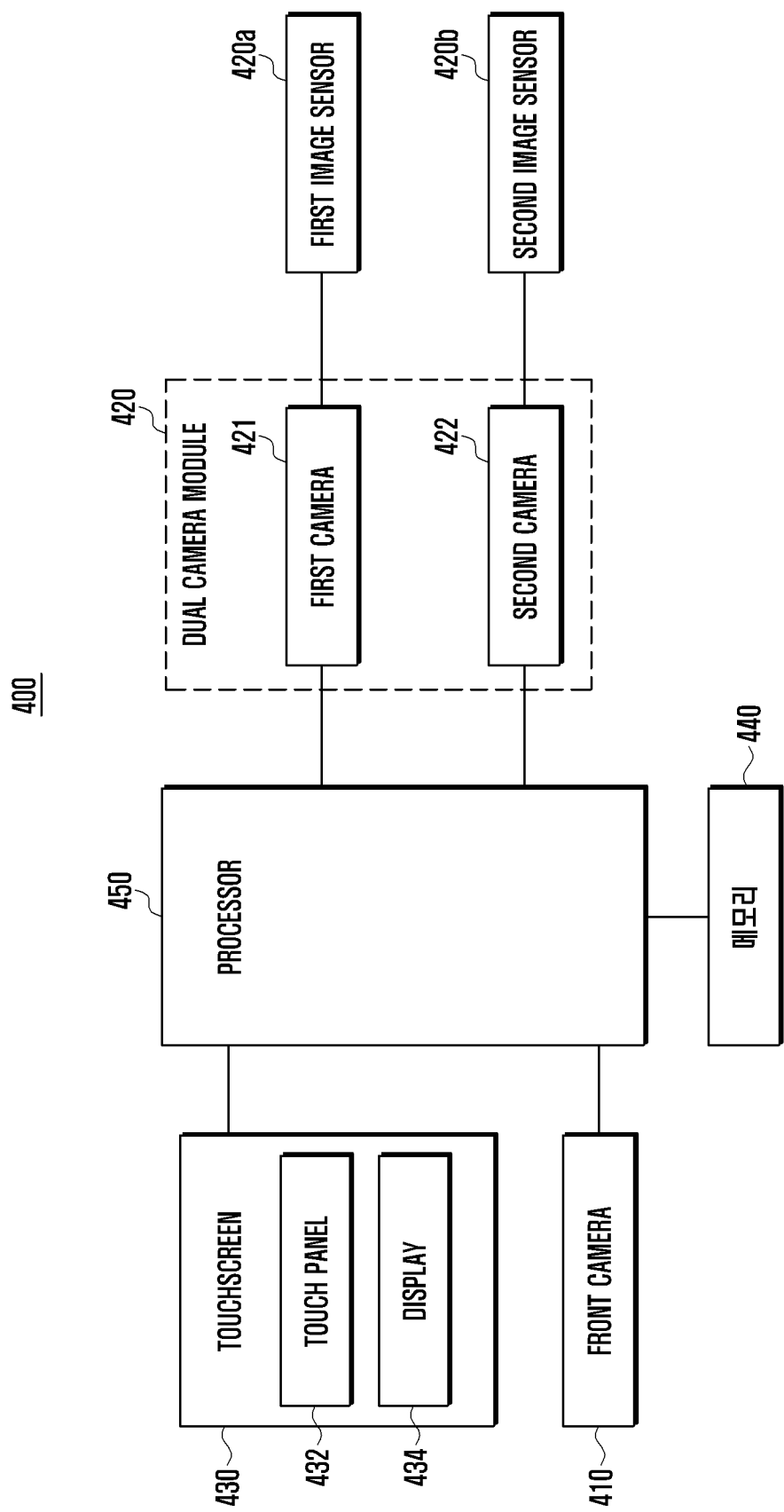
FIG. 4 is a block diagram of an electronic device according to various embodiments of the disclosure.

FIG. 4 is a block diagram of an electronic device according to various embodiments of the disclosure.

With reference to FIG. 4, the electronic device 400 (e.g., electronic device 101 in FIG. 1, or electronic device 201 in FIG. 2) according to various embodiments of the disclosure may include a front camera 410, a dual camera module 420, a touchscreen 430, a memory 440, and a processor 450.

The front camera 410 (e.g., camera module 291 in FIG. 2) may be mounted on one side (e.g., front surface) of the electronic device 400 such as a smartphone, and may obtain an image of an object (target object) in front of the electronic device 400.

In various embodiments, the front camera 410 may capture a still image or a moving image of a target object in front of the electronic device 400. The front camera 410 may include a lens, an image signal processor (ISP), a digital signal processor (DSP), and a flash (e.g., LED or xenon lamp). The front camera 410 can capture an image of an object by using a CCD (charge coupled device) or CMOS (complementary metal oxide semiconductor) image sensor, which converts light incident through the lens into an electrical signal.

The dual camera module 420 may be mounted on another side (e.g., rear surface) of the electronic device 400, and may obtain an image of a target object behind the electronic device 400.

In various embodiments, the dual camera module 420 may include a first camera 421 and a second camera 422 each capable of photographing a still image or moving image of a target object behind the electronic device 400. The first camera 421 and the second camera 422 may each include a lens, an image signal processor (ISP), a digital signal processor (DSP), and a flash (e.g., LED or xenon lamp).

In various embodiments, the first camera 421 and the second camera 422 may include a first image sensor 420a and a second image sensor 420b, respectively. The first image sensor 420a and the second image sensor 420b may each detect information on a target object behind the electronic device 400 and convert the object information into an electrical image signal. The first image sensor 420a and the second image sensor 420b may each include a CCD or CMOS to convert light incident through the lens of the first camera 421 or the second camera 422 into an electrical signal.

In various embodiments, the first image sensor 420a and the second image sensor 420b may be driven independently or simultaneously under the control of the processor 450. The first image sensor 420a may obtain a first image of an external object behind the electronic device 400. The second image sensor 420b may obtain a second image of the external object behind the electronic device 400.

In various embodiments, the first image sensor 420a may be configured to make a prediction about a high-illuminance environment (e.g., bright outdoors). The second image sensor 420a may be configured to make a prediction about a low-illuminance environment (e.g., in a dark room). For example, the first image sensor 420a obtaining a first image may be initially configured to detect the exposure based on a high illuminance range, and the second image sensor 420b obtaining a second image may be initially configured to detect the exposure based on a low illuminance range. As another example, the first image sensor 420a may be initially configured to detect the exposure based on a low illuminance range, and the second image sensor 420b may be initially configured to detect the exposure based on a high illuminance range.

In various embodiments, the first and second image sensors 420a and 420b can adjust the dynamic range of the image under the control of the processor 450 by adjusting the pixels representing the illuminance and brightness of the image of an object, for example, behind the electronic device 400. For example, the first image sensor 420a and the second image sensor 420b can operate in a high dynamic range (HDR) by adjusting the luminance level from the dark portion to the bright portion of the object image.

In various embodiments, the first image sensor 420a of the first camera 421 and the second image sensor 420b of the second camera 422 may have different sensing or aperture values. When the first image sensor 420a and the second image sensor 420b have different sensing or aperture values, if the first camera 421 and the second camera 422 have a large difference in brightness with respect to the luminance, the second camera 422 having a small aperture value can be used for illuminance prediction based on the low illuminance range (e.g., 0 to 10 Ev (exposure value)). For example, when the dual camera module 420 is used in a low-illuminance environment, the first camera 421 having a large aperture value and a low sensitivity uses a larger gain and is susceptible to noise. Hence, in a low-illuminance environment, the second camera 422 may be used for illuminance prediction.

In various embodiments, it is possible to use not only the dual camera module 420 but also a single camera having a sensor structure (e.g., HDR sensor) capable of supporting high luminance exposure and low luminance exposure for individual pixels. In this case, it is possible to rapidly predict the illuminance for an object by simultaneously applying short exposure based on the high illuminance range and long exposure based on the low illuminance range, applying the sensor output to each pixel, and measuring the exposure for the high illuminance and the low illuminance.

In various embodiments, it will be described that the front camera 410 is mounted on one side (e.g., front) of the electronic device 400 and the dual camera module 420 is mounted on the other side (e.g., back) of the electronic device 400. However, without being limited thereto, the dual camera module 420 may be mounted on one side (e.g., front) of the electronic device 400 and the front camera 410 may be mounted on the other side of the electronic device 400.

The touchscreen 430 (e.g., display 160 in FIG. 1, or display 260 in FIG. 2) may be used to generate a signal for operating the first camera 421 and the second camera 422 mounted on the rear of the electronic device 400 independently or simultaneously. According to the signal generated through the touchscreen 430, the first camera 421 and the second camera 422 may be activated independently or simultaneously to capture images. The touchscreen 430 may display a preview image captured by the first image sensor 420a of the first camera 421 and the second image sensor 420b of the second camera 422. The preview image may be a third image.

In various embodiments, the touchscreen 430 may perform an input function and a display function. To this end, the touchscreen 430 may include a touch panel 432 and a display 434. The touch panel 432 may be composed of a touch sensing sensor based on a capacitive overlay, a resistive overlay, or an infrared beam, or may be composed of a pressure sensor. In addition to the above sensors, any type of sensor device capable of sensing contact with an object or pressure of an object may constitute the touch panel 432.

The touch panel 432 may sense a touch input of the user, generate a sensing signal, and transmit the sensing signal to the processor 450. The sensing signal may include coordinate data of a touch input by the user. When the user performs a touch-and-movement operation, the touch panel 432 may generate a sensing signal including coordinate data of the touch movement path and transmit the sensing signal to the processor 450.

In various embodiments, the display 434 may display various menus of the electronic device 400, information entered by the user, or information to be provided to the user. The display 434 may be composed of a liquid crystal display, an OLED (organic light emitting diode), an AMO-LED (active matrix organic light emitting diode), a flexible display, or a transparent display. The display 434 may provide various screens according to the usage of the electronic device 400, such as a home screen, a menu screen, a lock screen, a game screen, a web page screen, a call screen, and a music or video play screen.

The memory 440 (e.g., memory 130 in FIG. 1, or memory 230 in FIG. 2) may store instructions configured to make an illuminance prediction in a high illuminance environment (e.g., bright outdoors) through the first image sensor 420a, and instructions configured to make an illuminance prediction in a low illuminance environment (e.g., in a dark room) through the second image sensor 420b. For example, the memory 440 may store a first setting for exposure based on a high illuminance range (e.g., 10 to 19 Ev (exposure value)) in association with the first image sensor 420a for an external object, and a second setting for exposure based on a low illuminance range (e.g., 0 to 10 Ev (exposure value)) in association with the second image sensor 420a for an external object. The images obtained through the first image sensor 420a and the second image sensor 420b may be compressed, encoded, and stored in the memory 440.

For example, alternatively, the memory 440 (e.g., memory 130 in FIG. 1, or memory 230 in FIG. 2) may store instructions configured to make an illuminance prediction in a low illuminance environment (e.g., in a dark room) through the first image sensor 420a, and instructions configured to make an illuminance prediction in a high illuminance environment (e.g., bright outdoors) through the second image sensor 420b.

In various embodiments, the memory 440 may store a program for controlling processing of the processor 450, an operating system (OS), various applications, and input and output data, and may store a program for controlling the overall operation of the electronic device 400. The memory 440 may store a user interface (UI) provided by the electronic device 400 and various configuration information necessary for processing in the electronic device 400.

The processor 450 (e.g., processor 120 in FIG. 1, or processor 210 in FIG. 2) may control the first image sensor 420a and the second image sensor 420b to operate independently or simultaneously. The processor 450 may control the first image sensor 420a to perform illuminance prediction in a high illuminance environment (e.g., bright outdoor) and may control the second image sensor 420b to perform illuminance prediction in a low illuminance environment (e.g., in a dark room). The processor 450 may control the first image sensor 420a and the second image sensor 420b to adjust the dynamic range of the image by adjusting pixels representing the illuminance and luminance of the image of an object behind the electronic device 400.

In various embodiments, the processor 450 may be configured to use the first image sensor 420a to obtain a first image of a target object by using a first setting for the exposure based on a high illuminance range (e.g., 10 to 19 Ev (exposure value)), and may be configured to use the second image sensor 420b to obtain a second image of the target object by using a second setting for the exposure based on a low illuminance range (e.g., 0 to 10 Ev (exposure value)). The processor 450 may be configured to select a corresponding one of the first setting and the second setting based on at least the first image obtained through the first image sensor 420a or the second image obtained through the second image sensor 420b. The processor 450 may be configured to obtain a third image (e.g., preview image) of the external object (target object) through the first image sensor 420a or the second image sensor 420b based at least on the corresponding setting.

In various embodiments, the processor 450 may synthesize the first image obtained through the first image sensor 420a and the second image obtained through the second image sensor 420b to produce another image.

In various embodiments, the processor 450 may be configured to display the obtained third image as a preview image. The processor 450 may be configured to select the first setting if the illuminance calculated based on the first image acquired through the first image sensor 420a satisfies a preset threshold (e.g., threshold value of 10 Ev), and may be configured to select the second setting if the preset threshold not satisfied.

In various embodiments, the processor 450 may be configured to select the first setting if the illuminance calculated based on the first image acquired through the first image sensor 420a satisfies a preset threshold, and may be configured to select the second setting if the illuminance calculated based on the second image acquired through the first image sensor 420a satisfies the preset threshold.

In various embodiments, the processor 450 may be configured to display the preview by using the first image sensor 420a if the first setting is selected, and may be configured to display the preview by using the second image sensor 420b if the second setting is selected.

In various embodiments, the processor 450 may be configured to generate a third setting based at least on the first image obtained through the first image sensor 420a or the second image obtained through the second image sensor 420b, and obtain a fourth image of the external object through the first image sensor 420a or the second image sensor 420b based at least on the third setting.

In various embodiments, the processor 450 may be configured to generate a fourth setting based at least on the first image obtained through the first image sensor 420a or the second image obtained through the second image sensor 420b, and obtain a fifth image of the external object through the first image sensor 420a or the second image sensor 420b based at least on the fourth setting.

In various embodiments, the processor 450 may control the overall operation of the electronic device 400, control signal flows between the internal components (e.g., front camera 410, dual camera module 420, touchscreen 430, and memory 440), and perform data processing. For example, the processor 450 may include a central processing unit (CPU), an application processor, and a communication processor. The processor 450 may be composed of a single-core processor, a multi-core processor, or a plurality of processors.

As described above, in various embodiments, the dual camera module 420 including the first camera 421 and the second camera 422 is mounted on one side (e.g., rear surface) of the electronic device 400, illuminance prediction is performed using the first image sensor 420a of the first camera 421 and the second image sensor 420b of the second camera 422, and the exposure of the first image sensor 420a or the second image sensor 420b is set based on the predicted illuminance. Hence, the entry time of the dual camera module 420 for an external object can be shortened.

Figure 5:
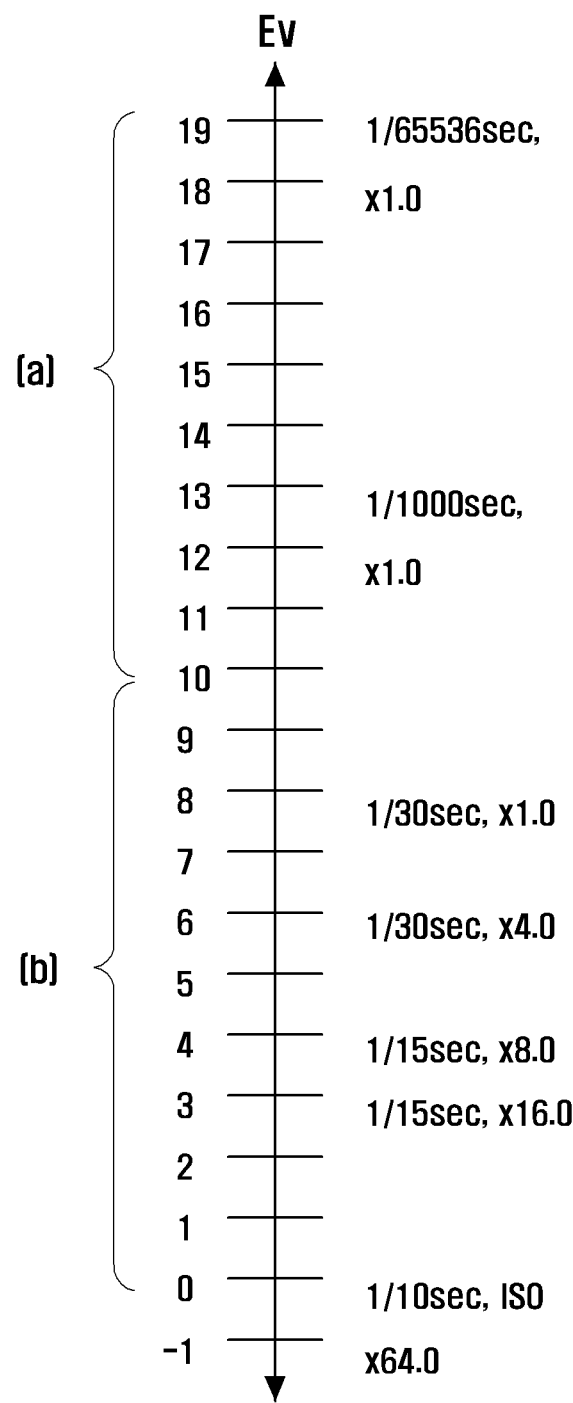
FIG. 5 shows an example of exposure prediction settings based on illuminance for the first image sensor and the second image sensor according to various embodiments of the disclosure.

FIG. 5 shows an example of exposure prediction settings based on illuminance for the first image sensor and the second image sensor according to various embodiments of the disclosure. Part (a) of FIG. 5 illustrates settings for illuminance prediction in a high-illuminance environment (e.g., bright outdoor) through the first image sensor. Part (b) of FIG. 5 illustrates settings for illuminance prediction in a low-illuminance environment (e.g., in a dark room) through the second image sensor.

With reference to FIG. 5, in various embodiments, the electronic device 400 can predict the brightness for the first image sensor 420a and the second image sensor 420b of the dual camera module 420 by dividing the brightness control range into a high illuminance range and a low illuminance range. For example, the high illuminance range may be 10 to 19 Ev (exposure value), and the low illuminance range may be 0 to 10 Ev (exposure value).

In various embodiments, with reference to FIGS. 4 and 5, in the dual camera module 420 mounted on one side (e.g., rear surface) of the electronic device 400, the first camera 421 may be initially configured to predict the exposure based on the high illuminance range (e.g., illuminance range of 10 to 19 Ev in part (a) of FIG. 5) through the first image sensor 420a, and the second camera 422 may be initially configured to predict the exposure based on the low illuminance range (e.g., illuminance range of 0 to 10 Ev in part (b) of FIG. 5) through the second image sensor 420b. Alternatively, in the dual camera module 420 mounted on the back of the electronic device 400, the first camera 421 may be initially configured to predict the exposure based on the low illuminance range (e.g., illuminance range of 0 to 10 Ev in part (b) of FIG. 5) through the first image sensor 420a, and the second camera 422 may be initially configured to predict the exposure based on the high illuminance range (e.g., illuminance range of 10 to 19 Ev in part (a) of FIG. 5) through the second image sensor 420b.

That is, in the dual camera module 420 mounted on one side (e.g., rear surface) of the electronic device 400, both the first image sensor 420a of the first camera 421 and the second image sensor 420b of the second camera 422 are used to reduce the illuminance (brightness) prediction time for the external environment, shortening the entry time of the first camera 421 or the second camera 422.

For example, when the dual camera module 420 is operated in an environment with a high illuminance level (e.g., 10 to 19 Ev), the first image sensor 420a of the first camera 421 whose exposure is set based on the high illuminance range may receive the output of a predictable illuminance range (e.g., high illuminance). However, the second image sensor 420b of the second camera 422 whose exposure is set based on the low illuminance range may receive incident light brighter than the predictable illumination range, so that the pixels of the second image sensor 420b may be saturated. In this case, illuminance prediction can be performed only using the output of the first image sensor 420a of the first camera 421 by ignoring the output of the second image sensor 420b of the second camera 422.

When the dual camera module 420 is operated in an environment with a low illuminance level (e.g., 0 to 10 Ev), the first image sensor 420a of the first camera 421 whose exposure is set based on the high illuminance range may be unusable for illuminance prediction. However, the second image sensor 420b of the second camera 422 whose exposure is set based on the low illuminance range may be usable for illuminance prediction. In this case, illuminance prediction can be performed only using the output of the second image sensor 420b of the second camera 422 by ignoring the output of the first image sensor 420a of the first camera 422.

Thus, when the dual camera module 420 is operated in a high illuminance environment (e.g., 10 to 19 Ev) or in a low illuminance environment (e.g., 0 to 10 Ev), the illuminance for the target object can be predicted rapidly by selecting the output of the first image sensor 420a or the second image sensor 420b according to the brightness environment. That is, in various embodiments, as the second camera 422 is equipped together with the first camera 421 in the rear surface of the electronic device 400, the number of frames required for illuminance prediction about the target object can be reduced.

For example, when only one camera is mounted on one side (e.g., rear surface) of the electronic device 400 like a smartphone, it may be impossible to predict the illuminance control range for an object with only one frame of the image sensor, and at least two frames may be required. However, in various embodiments of the disclosure, the electronic device 400 may use the output from the first image sensor 420a and the second image sensor 420b of the first camera 421 and the second camera 422 mounted on the rear side to predict the illuminance for the target object by dividing the brightness control range into a high illuminance range and a low illuminance range. Hence, the illuminance can be predicted using, for example, only one frame.

Figure 6A:
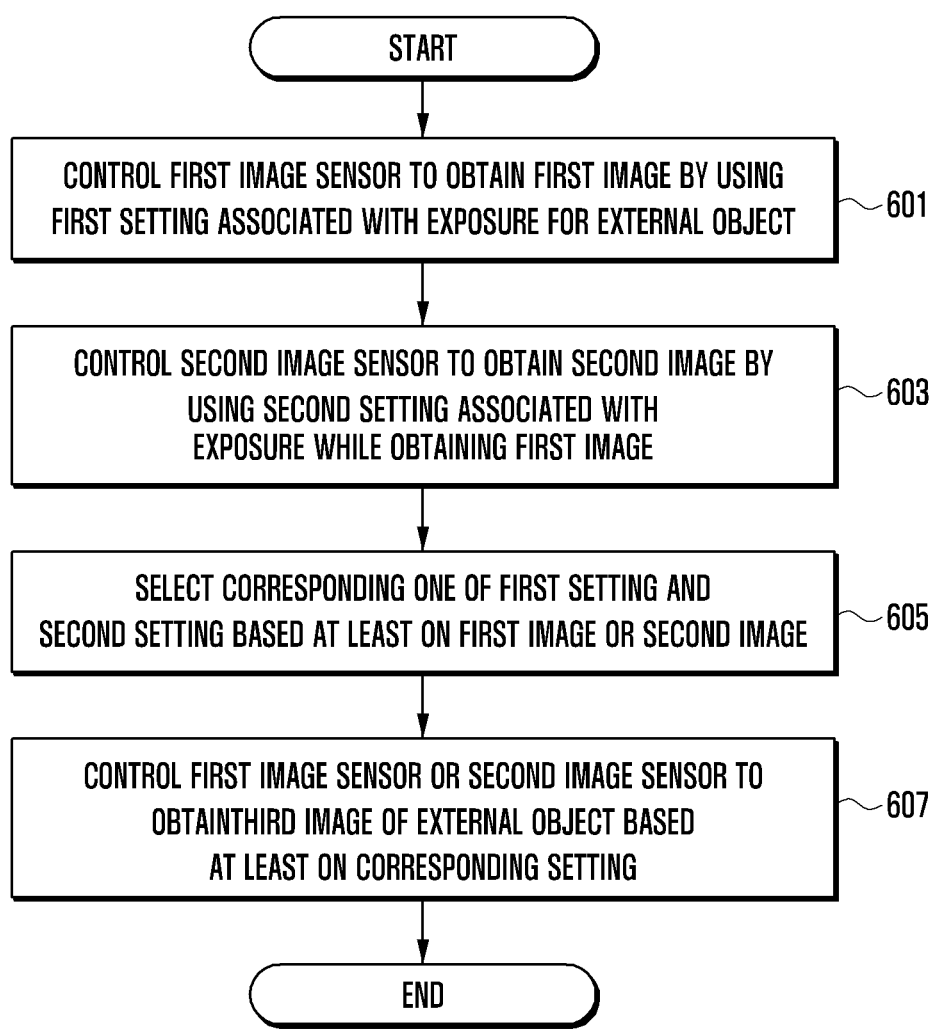
FIG. 6A is a flowchart of a method for controlling dual cameras mounted on one side of the electronic device according to various embodiments of the disclosure.

FIG. 6A is a flowchart of a method for controlling dual cameras mounted on one side of the electronic device according to various embodiments of the disclosure.

At operation 601, the processor 450 may control the first image sensor 420a to obtain a first image by using a first setting associated with exposure for an external object.

For example, the processor 450 may obtain a first image by initializing the first image sensor 420a to detect the exposure based on a high illuminance range (e.g., 10 to 19 Ev).

At operation 603, the processor 450 may control the second image sensor 420b to obtain a second image by using a second setting associated with exposure while obtaining the first image through the first image sensor 420a.

For example, the processor 450 may obtain a second image by initializing the second image sensor 420a to detect the exposure based on a low illuminance range (e.g., 0 to 10 Ev).

At operation 605, the processor 450 may select a corresponding one of the first setting and the second setting based at least on the first image obtained through the first image sensor 420a or the second image obtained through the second image sensor 420b.

At operation 607, the processor 450 may control the first image sensor 420a or the second image sensor 420b to obtain a third image (e.g., preview image) of the external object based at least on the corresponding setting.

Figure 6B:
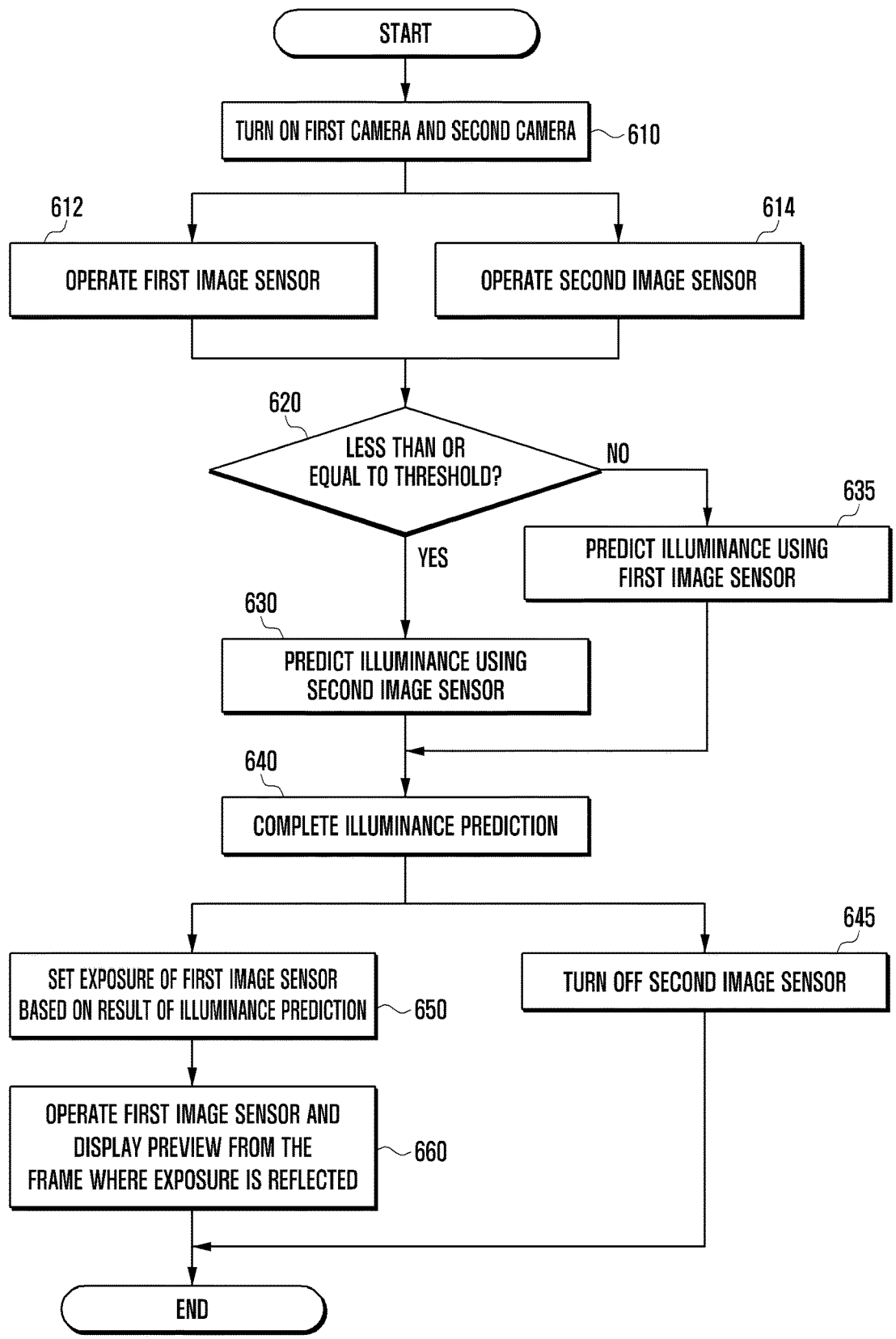
FIG. 6B is a flowchart of another method for controlling dual cameras mounted on one side of the electronic device according to various embodiments of the disclosure.

FIG. 6B is a flowchart of another method for controlling dual cameras mounted on one side (e.g., back) of the electronic device according to various embodiments of the disclosure.

At operation 610, the processor 450 may turn on the dual camera module 420 in response to, for example, a user touch on the dual camera icon on the touchscreen 430.

In various embodiments, the processor 450 may set the initial exposure (e.g., first setting) of the first camera 421 of the dual camera module 420 based on a high illuminance range (e.g., 10 to 19 Ev), and set the initial exposure (e.g., second setting) of the second camera 421 based on a low illuminance range (e.g., 0 to 10 Ev). The first image sensor 420a of the first camera 421 may be configured to make an illuminance prediction in a high illuminance environment (e.g., bright outdoor). The second image sensor 420b of the second camera 421 may be configured to make an illuminance prediction in a low illuminance environment (e.g., in a dark room).

For example, the first image sensor 420a may be initially configured to detect exposure of a high illuminance range (e.g., 10 to 19 Ev) and obtain a first image, and the second image sensor 420b may be initially configured to detect exposure of a low illuminance range (e.g., 0 to 10 Ev) and obtain a second image.

At operation 612 and operation 615, the processor 450 may control the first image sensor 420a of the first camera 421 and the second image sensor 420b of the second camera 422 to operate, respectively.

At operation 620, the processor 450 may measure the illuminance of the surrounding environment and determine whether it is greater than or equal to a preset threshold (e.g., 10 Ev). For example, the processor 450 may determine the measured illuminance being higher than the threshold as high illuminance (e.g., 10 to 19 Ev), and determine the measured illuminance being lower than or equal to the threshold as low illuminance (e.g., 0 to 10 Ev). If the measured illuminance is lower than or equal to the threshold, at operation 630, the processor 450 may predict the illuminance by using the second image sensor 420b of the second camera 422.

If the measured illuminance is greater than the threshold, at operation 635, the processor 450 may predict the illuminance by using the first image sensor 420a of the first camera 421.

At operation 640, the processor 450 may complete the illuminance prediction according to whether the illuminance of the surrounding environment is below or above the threshold through operation 630 or operation 635.

At operation 645, the processor 450 may turn off the second image sensor 420b of the second camera 422 because only the first camera 421 will be driven after the illuminance prediction is completed at operation 640.

At operation 650, the processor 450 may set the exposure of the first image sensor 420a based on the result of illuminance prediction completed at operation 640.

At operation 660, the processor 450 may operate the first image sensor 420a according to the exposure set at operation 650 and may display a preview (e.g., third image) from the frame in which the exposure is reflected.

Figure 7:
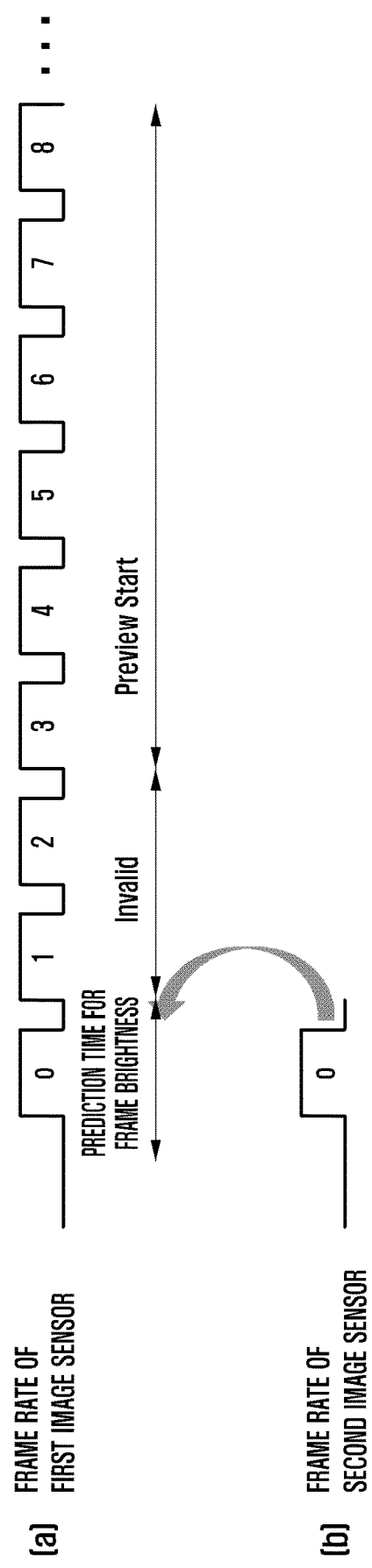
FIG. 7 depicts a scheme for shortening the illuminance prediction time of dual cameras according to various embodiments of the disclosure.

FIG. 7 depicts a scheme for shortening the illuminance prediction time of dual cameras according to various embodiments of the disclosure. Part (a) of FIG. 7 shows frames associated with the initial exposure setting of the first image sensor. Part (b) of FIG. 7 shows a frame associated with the initial exposure setting of the second image sensor.

In various embodiments, as shown in part (a) of FIG. 7, the electronic device 400 may drive the first image sensor 420a at a frame rate of the normal mode to predict the brightness in a high illuminance environment (e.g., 10 to 19 Ev).

In various embodiments, as shown in part (b) of FIG. 7, the electronic device 400 may drive the second image sensor 420b at a frame rate of the normal mode to predict the brightness in a low illuminance environment (e.g., 0 to 10 Ev).

In various embodiments, the electronic device 400 can predict the brightness for the first image sensor 420a and the second image sensor 420b of the dual camera module 420 by dividing the illuminance (brightness) control range into a high illuminance range and a low illuminance range.

For example, as shown in parts (a) and (b) of FIG. 7, the first image sensor 420a and the second image sensor 420b can predict brightness in a high or low illuminance environment using only one frame (e.g., frame 0). If the illuminance of the surrounding environment is high (e.g., 10 to 19 Ev) as a result of illuminance prediction, the processor 450 may turn off the second image sensor 420b. For example, the processor 450 may start previewing from frame 3 after the delay time of two (invalid) frames (frames 1, 2) of the first image sensor 420b. The delay (invalid) time of the first image sensor 420b may be the sensing entrance wait time of the first image sensor 420b.

Hence, in various embodiments, the dual camera module 420 can display a preview image rapidly as the time required for illuminance prediction takes only one frame (e.g., frame 0 in FIG. 7).

Figure 8:
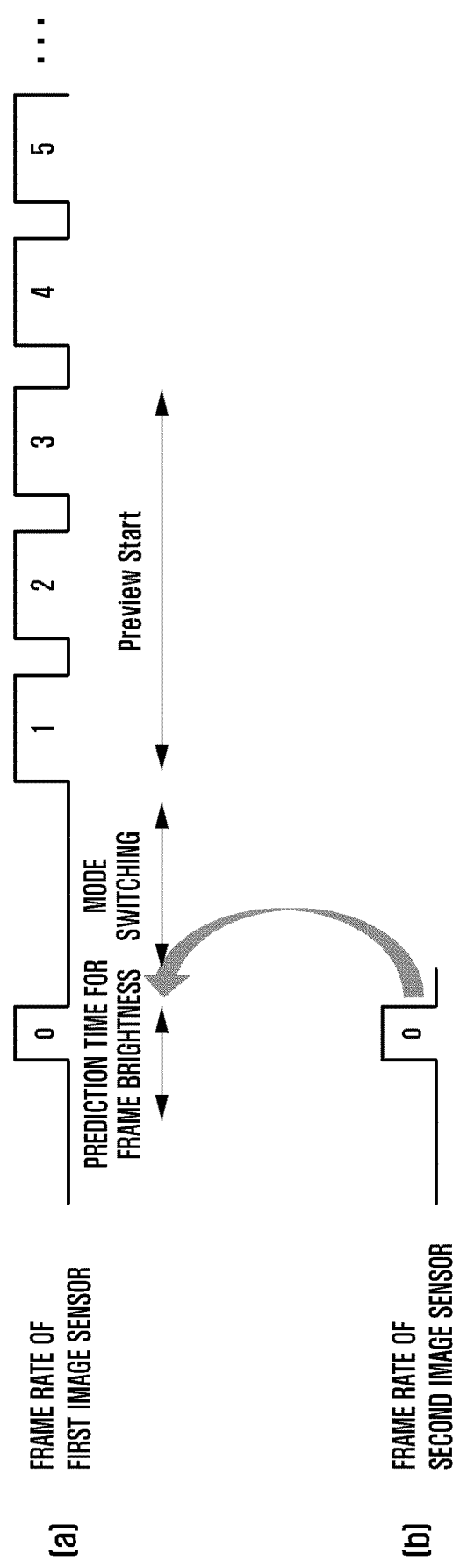
FIG. 8 depicts another scheme for shortening the illuminance prediction time of dual cameras according to various embodiments of the disclosure.

FIG. 8 depicts another scheme for shortening the illuminance prediction time of dual cameras according to various embodiments of the disclosure. Part (a) of FIG. 8 shows frames associated with the initial exposure setting of the first image sensor. Part (b) of FIG. 8 shows a frame associated with the initial exposure setting of the second image sensor.

In various embodiments, as shown in part (a) of FIG. 8, the electronic device 400 may drive the first image sensor 420a at a high frame rate to predict brightness in a high illuminance environment (e.g., 10 to 19 Ev). When driving the first image sensor 420a at a high frame rate, the initial frame (e.g., frame 0) of the first image sensor 420a may be shorter than that frame (e.g., frame 0) shown in part (a) of FIG. 7.

In various embodiments, as shown in part (b) of FIG. 8, the electronic device 400 may drive the second image sensor 420a at a high frame rate to predict brightness in a low illuminance environment (e.g., 0 to 10 Ev). When driving the second image sensor 420b at a high frame rate, the initial frame (e.g., frame 0) of the second image sensor 420b may be shorter than that frame (e.g., frame 0) shown in part (b) of FIG. 7.

As shown in parts (a) and (b) of FIG. 8, the first image sensor 420a and the second image sensor 420b can predict brightness in a high or low illuminance environment using only one high-speed frame (e.g., frame 0). If the illuminance of the surrounding environment is high (e.g., 10 to 19 Ev) as a result of illuminance prediction, the processor 450 may turn off the second image sensor 420b. The processor 450 may start previewing from frame 1 after mode switching to drive the first image sensor 420a at a frame rate of the normal mode for preset frames. In this case, a mode switching time corresponding to a preset number of frames is additionally required for the first camera 421 and the second camera 422 of the dual camera module 420. However, as the frame used for illuminance prediction is immediately applied due to mode switching, an invalid frame may be not generated.

In various embodiments, the electronic device 400 can predict the brightness for the first image sensor 420a and the second image sensor 420b of the dual camera module 420 by dividing the illuminance (brightness) control range into a high illuminance range and a low illuminance range. Hence, the dual camera module 420 can shorten the entry time thereof by a reduction in the number of frames required for illuminance (brightness) prediction.

Figure 9:
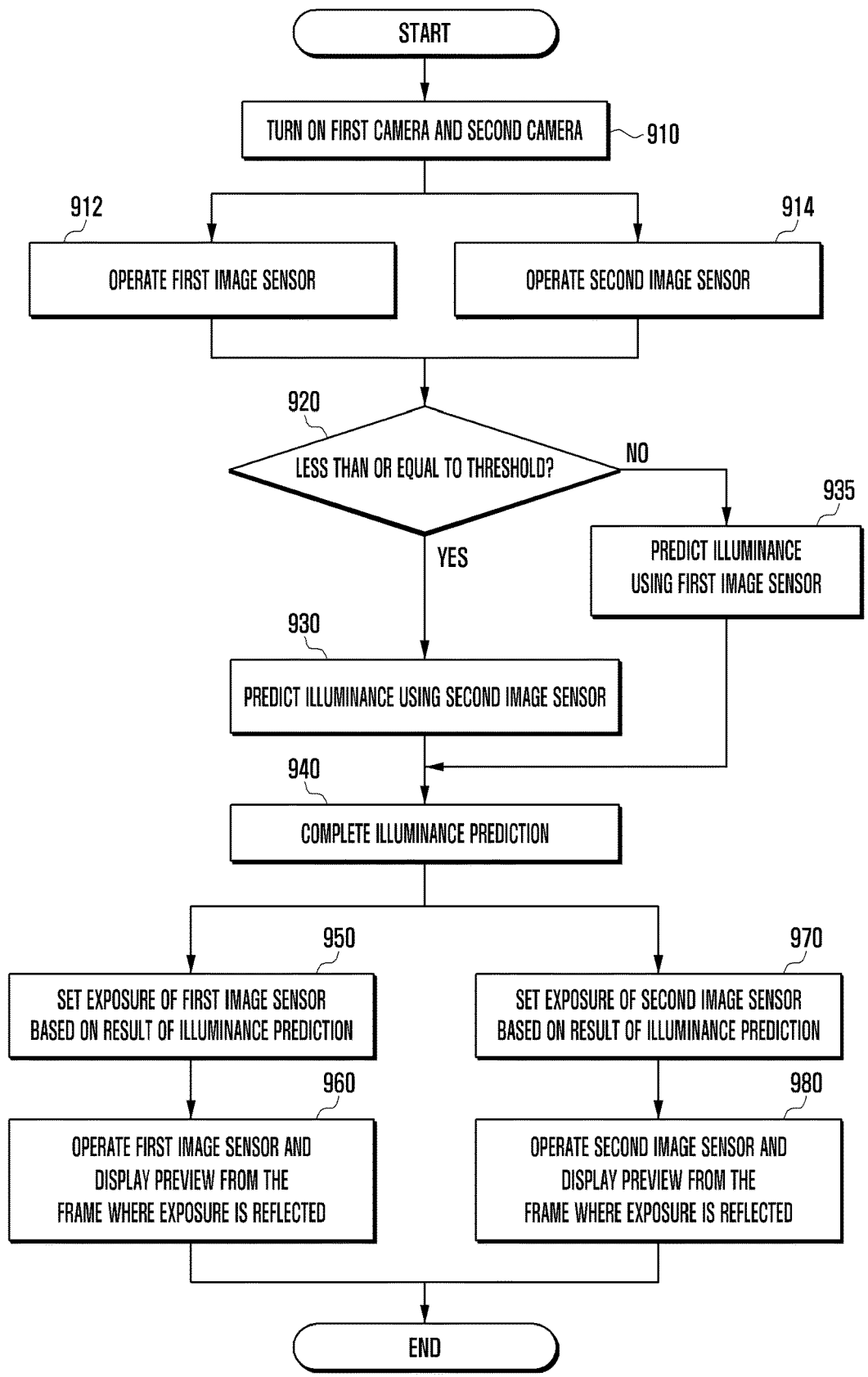
FIG. 9 is a flowchart of another method for controlling dual cameras mounted on one side of the electronic device according to various embodiments of the disclosure.

FIG. 9 is a flowchart of another method for controlling dual cameras mounted on the back of the electronic device according to various embodiments of the disclosure.

At operation 910, the processor 450 may turn on the dual camera module 420 in response to, for example, a user touch on the dual camera icon on the touchscreen 430.

In various embodiments, the processor 450 may set the initial exposure (e.g., first setting) of the first camera 421 of the dual camera module 420 based on a high illuminance range (e.g., 10 to 19 Ev), and set the initial exposure (e.g., second setting) of the second camera 421 based on a low illuminance range (e.g., 0 to 10 Ev). The first image sensor 420a and the second image sensor 420b of the first camera 421 and the second camera 422 may each set outputs for different exposures and predict the illuminance. After completion of the illuminance prediction, the first image sensor 420a and the second image sensor 420b can set the predicted exposure (e.g., third setting) on the basis of the illuminance prediction. The first image sensor 420a of the first camera 421 may be configured to make an illuminance prediction in a high illuminance environment (e.g., bright outdoor). The second image sensor 420b of the second camera 421 may be configured to make an illuminance prediction in a low illuminance environment (e.g., in a dark room).

For example, the first image sensor 420a may be initially configured to detect exposure of a high illuminance range (e.g., 10 to 19 Ev) and obtain a first image, and the second image sensor 420b may be initially configured to detect exposure of a low illuminance range (e.g., 0 to 10 Ev) and obtain a second image.

At operation 912 and operation 914, the processor 450 may control the first image sensor 420a of the first camera 421 and the second image sensor 420b of the second camera 422 to operate, respectively.

At operation 920, the processor 450 may measure the illuminance of the surrounding environment and determine whether it is greater than or equal to a preset threshold (e.g., 10 Ev). For example, the processor 450 may determine the measured illuminance being higher than the threshold as high illuminance (e.g., 10 to 19 Ev), and determine the measured illuminance being lower than or equal to the threshold as low illuminance (e.g., 0 to 10 Ev).

If the measured illuminance is lower than or equal to the threshold, at operation 930, the processor 450 may predict the illuminance by using the second image sensor 420b of the second camera 422.

If the measured illuminance is greater than the threshold, at operation 935, the processor 450 may predict the illuminance by using the first image sensor 420a of the first camera 421.

At operation 940, the processor 450 may complete the illuminance prediction according to whether the illuminance of the surrounding environment is below or above the threshold through operation 930 or operation 935.

At operation 950, the processor 450 may set the exposure of the first image sensor 420a based on the result of illuminance prediction completed at operation 940.

At operation 960, the processor 450 may operate the first image sensor 420a according to the exposure set at operation 950 and may display a preview (e.g., third image) from the frame in which the exposure is reflected. For example, the processor 450 may generate a third setting based at least on the first image obtained through the first image sensor 420a. The processor 450 may be configured to obtain another image of the external object through the first image sensor 420a based at least on the third setting.

At operation 970, the processor 450 may set the exposure of the second image sensor 420b based on the result of illuminance prediction completed at operation 940.

At operation 980, the processor 450 may operate the first image sensor 420a according to the exposure set at operation 970 and may display a preview (e.g., fourth image) from the frame in which the exposure is reflected. For example, the processor 450 may generate a fourth setting based at least on the second image obtained through the second image sensor 420b. The processor 450 may be configured to obtain another image of the external object through the second image sensor 420b based at least on the fourth setting.

While the disclosure has been shown and described with reference to various embodiments thereof, it should be understood by those skilled in the art that many variations and modifications of the method and apparatus described herein will still fall within the spirit and scope of the disclosure as defined in the appended claims and their equivalents.

The invention claimed is:

1. An electronic device comprising:
    a display:
    a first image sensor to obtain a first image of an external object;
    a second image sensor to obtain a second image of the external object; and
    a processor operationally connected to the display, the first image sensor, and the second image sensor,
    wherein the processor is configured to:
        operate the first image sensor and the second image sensor,
        measure illuminance of a surrounding environment and determine if the illuminance is higher or lower than a preset threshold value,
        use the first image sensor to predict the illuminance if the surrounding environment is higher than the preset threshold value,
        use the second image sensor to predict the illuminance if the surrounding environment is lower than the preset threshold value,
        complete the illuminance prediction using at least one of the first image sensor or the second image sensor,
        configure an exposure of the first image sensor through the completed illuminance prediction,
        operate the first image sensor based on the exposure configuration,
        display a third image from a frame in which the exposure is reflected,
        configure exposure of the second image sensor through the completed illuminance prediction, operate the second image sensor based on the exposure configuration, and
        display a fourth image from the frame in which the exposure is reflected.

2. The electronic device of claim 1, wherein the processor is further configured to turn off the second image sensor when the illuminance prediction is complete and only operate the first image sensor.

3. The electronic device of claim 1, wherein the processor is further configured to display the third image as a preview.

4. The electronic device of claim 1, wherein the processor is further configured to display the fourth image as a preview.

5. A method of controlling an electronic device, the method comprising:
    operating a first image sensor and a second image sensor;
    measuring illuminance of a surrounding environment and determining if the illuminance is higher or lower than a preset threshold value;
    using the first image sensor to predict the illuminance if the surrounding environment is higher than the preset threshold value;
    using the second image sensor to predict the illuminance if the surrounding environment is lower than the preset threshold value;
    completing the illuminance prediction using at least one of the first image sensor and the second image sensor;
    configuring an exposure of the first image sensor through the completed illuminance prediction;
    operating the first image based on the exposure configuration;
    displaying a third image from a frame in which the exposure is reflected;
    configuring exposure of the second image sensor through the completed illuminance prediction, and operating the second image sensor based on the exposure configuration; and
    displaying a fourth image from the frame in which the exposure is reflected.

6. The method of claim 5, further comprising:
    turning off the second image sensor when the illuminance prediction is complete and only operating the first image sensor.

7. The method of claim 5, wherein the third image is displayed as a preview.

8. The method of claim 5, wherein the fourth image is displayed as a preview.

* * * * *